Feb. 20, 1968     O. J. MORELOCK     3,370,233
TEST APPARATUS FOR DETERMINING BETA AND LEAKAGE CURRENT OF AN
IN-CIRCUIT OR OUT-OF-CIRCUIT TRANSISTOR
Filed June 4, 1964     2 Sheets-Sheet 1
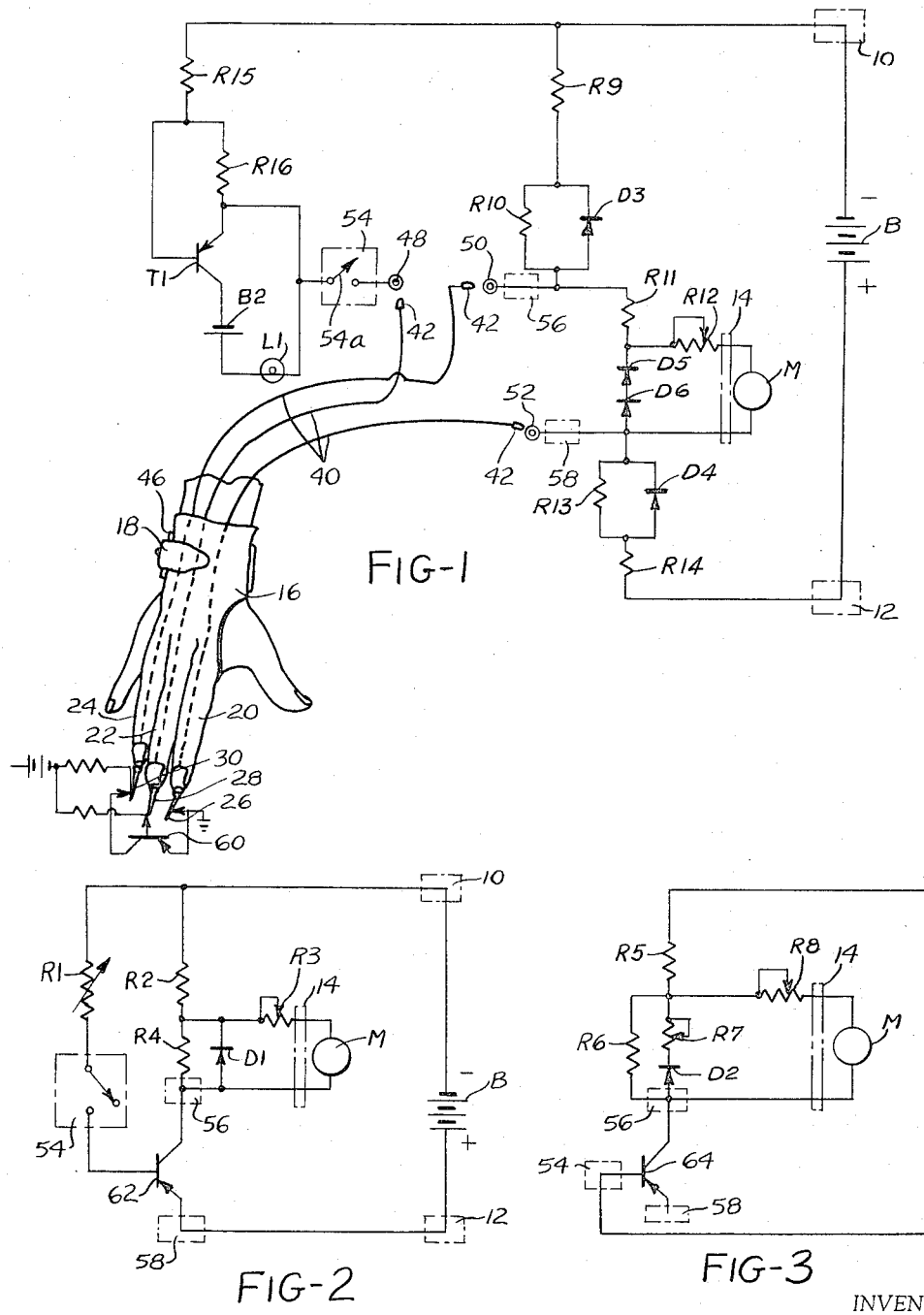
INVENTOR.
OLIVER JAMES MORELOCK
BY
Toulmin & Toulmin
ATTORNEYS

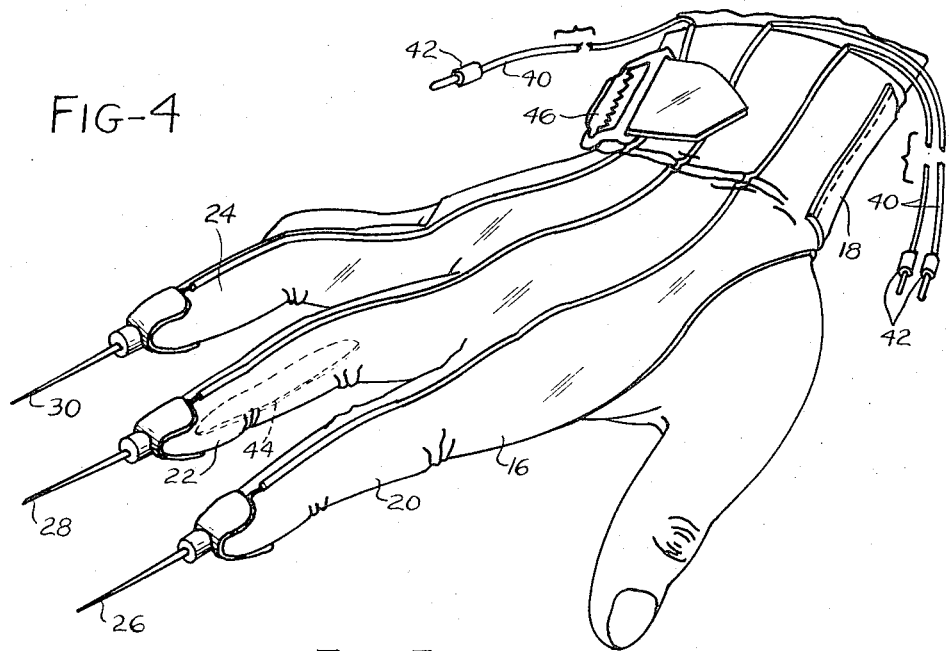
FIG-4
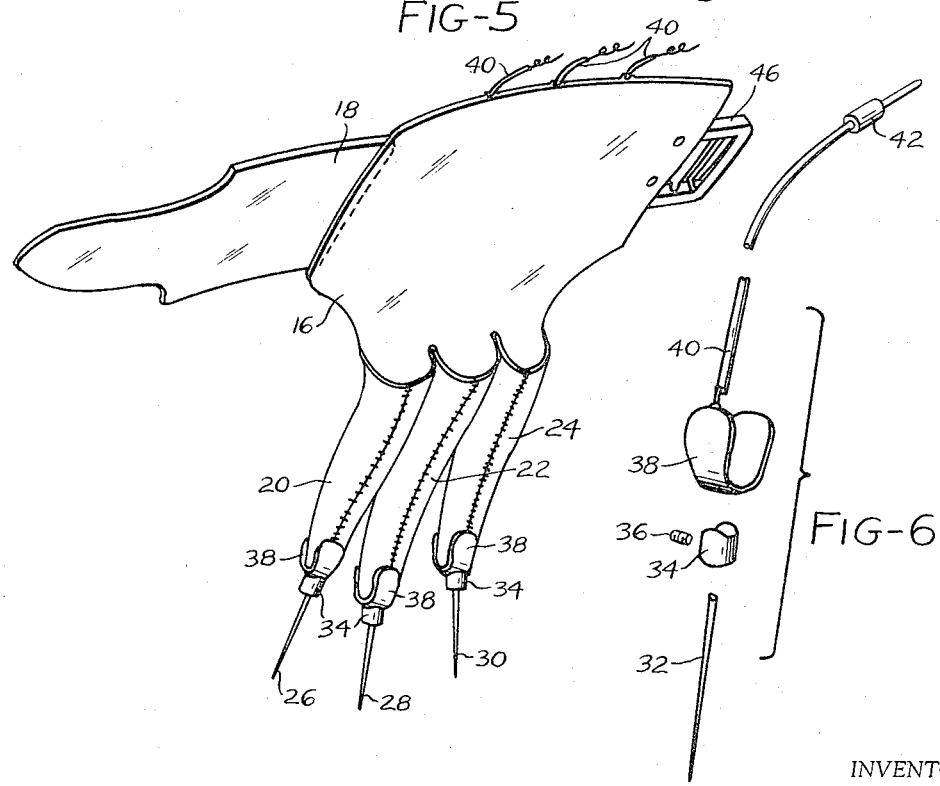
FIG-5
FIG-6
INVENTOR.
OLIVER JAMES MORELOCK
BY
Toulmin & Toulmin
ATTORNEYS United States Patent Office 3,370,233
Patented Feb. 20, 1968

3,370,233
TEST APPARATUS FOR DETERMINING BETA AND LEAKAGE CURRENT OF AN IN-CIRCUIT OR OUT-OF-CIRCUIT TRANSISTOR
Oliver James Morelock, Millington, N.J., assignor to The Triplett Electrical Instrument Co., Bluffton, Ohio, a corporation of Ohio
Filed June 4, 1964, Ser. No. 372,459
2 Claims. (Cl. 324—158)

ABSTRACT OF THE DISCLOSURE

Test circuit for transistors comprising a D.C. source with resistors and diodes connected across the terminals thereof and a measuring instrument connected across at least one of the diodes, probes for the collector and emitter of a transistor under test connected to the circuit with the resistors and diodes having symmetrically arranged between the points of connection of the probes to the circuit and the terminals of the D.C. source, the probes being on the tips of the fingers of a glove-like device and said device also including a probe for the base of the transistor under test for supplying voltage from the D.C. source to the base of the transistor under test.

---

This invention relates to the testing of electronic circuit components and is particularly concerned with a method and apparatus for testing solid-state electronic components such as transistors, diodes, and the like, either in-circuit or out-of-circuit.

Solid state electronic components of the nature referred to are used in large quantities in electronic amplifiers, counters, integrators, computers, and other equipment of this type. Since such components are subject to failure it is important to be able to test the electrical characteristics of the components whenever there is an irregularity in the operation of the circuit in which they are employed.

A common practice in connection with equipment of this nature is to design and assemble the components on printed circuit boards which boards, in addition to the components referred to, also carry other small components such as resistors, capacitors, small inductors, and the like. This provides for a compact grouping of the parts and assists in avoiding errors in wiring and breaks complex circuitry down into modules that can easily be removed as a unit for testing and inspection and which modules can easily be replaced by a corresponding module. While the forming of complex electronic circuits in the modules as referred to is quite advantageous it involves as a particular disadvantage the fact that one of the circuits on a printed circuit board may be defective and may include one or more solid-state components and it is extremely difficult to determine by any conventional test method exactly where the fault in the circuit lies.

It is, of course, possible to unsolder and remove a solid-state component from the printed circuit board for testing but this frequently leads to damage of the component due to broken leads or overheating thereof and may damage the printed circuit assembly. It has thus been found that, even with an electronic circuit broken down into modules, the repair of the individual sub-assemblies employing solid-state components, is expensive and time-consuming and the attempt to repair the modules sometimes does more damage than already existed in the module.

Attempts have been made to provide testing devices for such circuit boards but heretofore the results of these attempts has not been at all satisfactory. A testing device requires some form of alternating current (AC) signal generator together with an amplifier and an indicator, the indicator often taking the form of an oscilloscope. Still further, direct current (DC) sources must also be provided for operating the solid state component itself while the component is under test. It will be apparent that the foregoing sort of test apparatus involves an amount of test gear that is equivalent to a laboratory type testing setup. Also, the results obtained from a test setup of this nature, inasmuch as it involves alternating current, are often difficult to analyze, particularly because of the inductors and capacitors connected in-circuit with the solid-state component being tested. The inductors and capacitors create paths for the alternating current signal applied that can make it impossible to determine the actual condition of the solid-state component being tested.

With the foregoing in mind, it is a primary object of the present invention to provide a tester for testing solid-state components such as transistors and diodes in-circuit and in such a manner that the operating performance of the components can be accurately determined and without removal thereof from a printed circuit board in which they are connected.

Still another object of the present invention is the provision of an in-circuit tester of the nature referred to in which the performance of the component being tested is indicated directly by a meter, thus eliminating the need for an oscilloscope.

A further and particular object of the present invention is the provision of an in-circuit tester of the nature referred to that does not require an alternating current source of voltage but which can be operated by small batteries which provide the complete power for the tester.

Still another object of this invention is the provision of an in-circuit tester which can indicate directly on a meter the proportional D.C. beta of a transistor when the collector circuit thereof is shunted by a low resistance.

Another particular object of the present invention is the provision of an in-circuit tester that will be insensitive to collector circuit shunt resistances above a predetermined value and which will indicate directly on a meter resistance values below the said predetermined value and wherein the beta characteristic of the component can be read as a second meter reading.

Still another object of this invention is the provision of an in-circuit tester which will indicate both by illumination of a lamp and by the deflection of a meter pointer the conditions at the input and output junctions of a solid-state component such as a transistor when the latter is soldered in a printed circuit board.

It is also an object of this invention to provide a relatively simple battery operated tester for solid-state components such as transistors and diodes, which will not only provide for in-circuit testing of such devices but will also provide for out-of-circuit testing of the components when they are disconnected from the circuit board.

Another particular object of this invention is the provision of a novel arrangement for the probes and leads of a tester which will enable the operator of the tester to make the necessary connections to various points in the circuit board being tested, even where the elements of the circuit board are spaced closely together.

In general, the foregoing objects, as well as still other objects of the present invention are accomplished by providing a test circuit which supplies D.C. current and voltage to the solid state component under test and through non-linear circuit elements that direct and control the supplied current in its flow through the junctions of the component being tested and the indicating meter of the test device. The circuit includes means for limiting the supplied current and the supplied voltages to such a low value that no damage will occur to the solid state components under test, including transistors and diodes and the like.

Furthermore, the test device according to the present invention includes a glove-like carrier for the probes by means of which the testing device makes connection with the junctions of the components under test. The glove-like device has the probes mounted on the tips of the fingers thereof so that the probes can readily be manipulated by the operator of the test device, even where the components on the circuit board are crowded together.

The objects and advantages of the present invention as referred to above, as well as other objects and advantages thereof, will become more apparent upon reference to the following specification taken in connection with the accompanying drawings in which:

FIGURE 1 is a simplified diagram of the test device for in-circuit testing.

FIGURE 2 is a simplified circuit diagram showing the testing circuit for measuring the beta characteristics of a component.

FIGURE 3 is a simplified diagram showing the circuit for measuring the leakage current in the base collector circuit of a transistor.

FIGURE 4 is a diagrammatic view showing the glove-like device on the hand of the operator and which glove-like device carries the probes for making connection of the testing circuit for measuring the beta characteristics being tested.

FIGURE 5 is a perspective view of the glove-like device; and

FIGURE 6 is an exploded perspective view showing the individual elements of a probe carried on the end of a finger of the glove-like device.

With respect to the testing arrangement according to the present invention it will be understood FIGURES 1, 2, and 3 show only portions of the entire testing circuit, the portions shown in each figure being that portion of the circuit which is employed for the particular testing operation being carried out.

The entire circuit of the tester is thus a composite of the circuits illustrated in FIGURES 1, 2, and 3, with suitable switching means being provided for changing the connections in the circuit so that the meter and battery and probes are interconnected with circuit elements as shown in the individual views. Such composite circuit arrangements are well-known in various instruments and the switching from one circuit arrangement to another is also well-known in test instruments and for this reason no composite circuit including switching has been shown in this application.

It is to be understood, however, that the device according to the present invention comprises a single portable unit with all of the circuit elements associated with FIGURES 1, 2, and 3 embodied within the instrument and with there being switches in the instrument by means of which the circuit elements can be grouped in the manner illustrated in the drawings for test purposes.

The test device according to present invention has six basic functions which are enumerated as follows:

(1) Direct reading of D.C. beta with the transistor being tested in an out-of-circuit condition, as when removed from a printed circuit board, or prior to being inserted therein.

(2) Direct reading of leakage current, $I_{cbo}$, with the transistor out of circuit, as by being removed from the printed circuit board, or prior to being placed therein.

(3) Direct reading of shunt resistance values across the collector-emitter circuit of the transistor with the transistor mounted on the printed circuit board and for values below a predetermined minimum, for example, 200 ohms.

(4) Reading of the proportional D.C. beta of the transistor mounted on and connected in circuit on the printed circuit board.

(5) Lamp indication of base to emitter circuit continuity with the transistor connected on the printed circuit board.

(6) Direct reading of forward resistance of diodes connected in circuit on the printed circuit board.

With reference first to the portions of the testing device which are common to the different testing arrangements illustrated, the device includes battery means B, which are used in every instance in the testing device regardless of the circuit connections. The device also comprises an indicating meter, M, which is employed in every instance.

Associated with battery B, may be switch means, 10 and 12, by means of which the various connections of the battery in the circuits of FIGURES 1, 2, and 3, can be made. Pertaining to meter M are the switch means 14, that can be availed of for making the proper connection of the meter in the circuit being used.

The device also includes a glove or the like, 16, indicated in some detail in FIGURES 4, 5, and 6, and which essentially comprises a wrist strap portion, 18, and three finger portions, 20, 22, and 24, which have probes at the tip ends thereof. As will be seen the three finger portions carry the probes, 26, 28, and 30 respectively, with each probe comprising an elongated pointed conductive element, 32, mounted in a socket, 34, and held in position therein by set screw, 36. Socket, 34, is soldered to a curved conductive clip, 38, mounted on the tip of the pertaining finger, and electrically connected to each clip, 38, is a conductor, 40, running along the back of the pertaining finger of the glove and leading to a jack or plug type connector, 42, by means of which the several probes can be electrically connected to the portion of the device containing the battery and meter and the several circuit elements that make up the testing device.

The glove-like portion of the testing device preferably has the sides of the fingers cut out, as indicated by the dashed line 44 on one of the fingers in FIGURE 4, so that the fingers will be freely movable and contact can readily be established at any point in a printed circuit board without the sides of the glove interfering with manipulation of the probe.

The wrist-band portion includes buckle means, 46, so that it can easily be strapped to the wrist of the operator.

As will be seen in FIGURE 1, the several jacks, 42, or plugs pertaining to the conductors leading to the probe tips are receivable into sockets or plugs 48, 50, and 52, which form an integral part of the device containing the meter and battery and circuit components.

FIGURES 1, 2, and 3 also indicate the location of switch means at points 54, 56, and 58, which are provided for the purpose of effecting the various connections of the sockets 48, 50, and 52, to the circuit elements of the tester as may be required to set up the circuit arrangement of FIGURES 1, 2, or 3.

The provision of the switches as identified above permits all of the circuit elements of FIGURES 1, 2, and 3 to be embodied in a single unit and any of the connections illustrated in the drawings to be made at will. The switches may, of course, comprise multi-position snap switches having the various positions indicated by suitable legends and, in some cases, the switches could be multi-bank switches, thereby reducing the number of switches required.

With regard to the test circuit shown in FIGURE 1, a series of diodes $D_3$ through $D_6$ are employed, together with a group of resistors identified as $R_9$ through $R_{16}$. The circuit also includes transistor $T_1$, a second battery $B_2$, a lamp $L_1$, and the aforementioned switch 54.

The circuit is basically divided into two parts, (1) the base circuit consisting of resistors $R_{15}$ and $R_{16}$, transistor $T_1$, battery $B_2$, lamp $L_1$, and switch 54 toward the left, and (2) the collector-emitter circuit consisting of the balance of the circuit elements toward the right.

It will be understood that the circuit illustrated is simplified and that the polarities shown are for testing a PNP transistor connected in the circuit of a printed circuit board.

Inasmuch as non-linear elements are employed, especially the diodes referred to, the collector-emitter circuit is made symmetrical around the collector-emitter leads so that these two leads can be reversed for testing NPN transistors without the necessity of reversing battery B and diodes $D_3$ through $D_6$.

Similarly the base circuit is designed so as to be completely independent of battery $B_2$, so that as a two terminal network it can be connected either to the negative or to the positive side of battery B to reverse the base current to change from testing an NPN transistor to testing a PNP transistor.

With reference to the operation of the collector-emitter portion of the circuit of FIGURE 1, battery B supplies energy to the transistor emitter lead through resistor $R_{14}$, the parallel combination of resistor $R_{13}$ and $D_4$, and from the collector lead back through the parallel combination of resistor $R_{10}$ and diode $D_3$ and resistor $R_9$ connected serially therewith to the negative battery terminal.

If blade $54_A$ of switch 54 is in the open position as shown and the leads from the pertaining fingers of the probe are connected to the terminals of transistor 60, normal collector current will not flow because the transistor base is open circuited by the aforementioned open switch blade.

Any current in the leads leading to probes 26 and 30 connected to collector and emitter terminals, respectively, of transistor 60 will thus be the leakage current through this part of the transistor. This current is normally quite low, on the order of about 1 or 2 microamperes and for the purposes of consideration of the present invention can be neglected. The described connections also assume no shunt resistance path across the collector-emitter terminals on the printed circuit board.

Under the conditions referred to, namely, no shunt resistance path across the collector-emitter terminals, current will flow in the circuit through resistor $R_{11}$ and the serially connected diodes $D_5$ and $D_6$ and also through resistor $R_{12}$ and meter M which latter are connected in parallel with the said diodes. If a shunt path as referred to exists, somewhat different conditions are had, as will be explained hereinafter.

Resistors $R_9$, $R_{10}$, $R_{13}$, and $R_{14}$ are chosen to be of fairly low value so that, when the base current is switched on for the transistor, full collector current can flow. The meter M is essentially a microammeter with about 50 microamperes full scale deflection so that proper readings of the collector base leakage current can be made.

$R_{11}$ is selected at a relatively higher value of resistance and in this manner effectively determines the maximum current through the two diodes $D_5$ and $D_6$. The diodes referred to operate as stabistors and regulate and limit the voltage across the branch containing resistor $R_{12}$ and meter M in series. Resistor $R_{12}$ is variable, and with current flowing in the circuit but with the probe leads disconnected, resistor $R_{12}$ is adjusted to give full scale deflection of the pointer of the meter. The diodes $D_5$ and $D_6$ will stabilize this voltage at about 1.4 volts even though up to 4½ or 6 volts may be applied across the series circuit.

The current through the diodes increases with increased voltage at the terminals of battery B but the voltage across the diodes remains substantially constant. Most of the voltage drop, therefore, takes place in resistor $R_{11}$ as the voltage in the system changes.

The stabilizing effect of diodes $D_5$ and $D_6$ thus provides that the pointer of meter M cannot deflect beyond the top scale position thereof under any conditions no matter what connections are made at the glove terminals and whether a short circuit exists or not.

As mentioned before, the voltage between plugs 50 and 52, to which the leads are connected that lead to the collector and emitter terminals of the transistor, will be very nearly equal to the voltage of battery B if the probe is open circuited or is connected across transistor 60, while blade $54_A$ of switch 54 is open because the current through resistor $R_{10}$ and $R_{13}$ is so small that the voltage drop across the respective resistors is below the threshold of conduction of transistors $D_3$ and $D_4$ connected in parallel therewith.

With respect to the base circuit of transistor $T_1$ forming a part of the test device, the said transistor is normally in a non-conducting state so that no current flows through illuminating lamp $L_1$. Resistor $R_{16}$ is selected to provide turn-off current bias for transistor 60. $R_{15}$ is selected to allow the correct amount of base current to flow in the base circuit of transistor 60.

If the three probe elements, 26, 28, and 30 are now connected to the three terminals of a transistor on a printed circuit board, assuming no shunt paths between the terminals, and blade $54a$ of switch 54 is closed, and if transistor 60 has a normal base to emitter junction, base current will flow in the transistor and transistor $T_1$ of the test device will be forward biased and current will flow from battery $B_2$ through lamp $L_1$ and the lamp will be illuminated.

At the same time, collector current flows through resistors $R_9$, $R_{10}$, $R_{13}$ and $R_{14}$ to the transistor leads leading to probes 26 and 30. As this current rises, the drop across resistor $R_{10}$ and $R_{13}$ will reach a point where their pertaining diodes $D_3$ and $D_4$ are in the conduction region and the collector current will then be limited by the beta of transistor 60 and resistors $R_9$ and $R_{14}$.

The voltage across terminals 50 and 52 will drop below the diode threshold of diodes $D_5$ and $D_6$ and meter M will detect and indicate this voltage. The voltage indicated on the meter is proportional to the beta of the transistor 60 and its internal resistance.

It can readily be shown that this is the case because a measured amount of base current was introduced, controlled by battery $B_2$ and resistor $R_{15}$. The collector current can thus be noted in terms of beta $H_{FE}$.

Inasmuch as the meter M actually reads the product of collector current and internal transistor resistance, the meter deflection is in terms of what is referred to as "proportional beta."

While the instrument, when employed in the above described manner, will ignore shunt paths connected to the transistor leads of values over about 200 ohms, the instrument can be calibrated to read shunt resistances from 200 ohms down to as low as 10 ohms. This is done by opening blade $54_A$ of switch 54 and by connecting the probe leads to a transistor having collector to emitter shunt path resistance.

With open base circuit transistor resistance will be high causing no deflection of the meter pointer. With a low resistance shunt, however, in the region of say, 20 ohms, the meter pointer will deflect down scale and come to a reading at say, two thirds scale. When blade $54_A$ is now closed, if there is normal transistor action, the instrument pointer will deflect further down scale to about the same reading as would have obtained if there were no shunt path.

The pointer thus starts from a new position different from full scale position as determined by the 20 ohms shunt path.

It will be seen that the shunt resistance paths down to low values will thus have very little effect upon the proportional beta determined for the transistor or the internal resistance reading thereof. It will be evident that a good supply of voltage is needed to force current through the transistor and to provide reliable readings at low shunt resistance values. At the same time the current must be limited to avoid excessive dissipation in the transistor and deterioration of the battery.

According to the present invention this is accomplished by the two diode resistor networks in the series circuit for collector current. As soon as the diodes conduct, the current is limited by resistor $R_9$ and $R_{14}$. The voltage, however, is lowered by the conduction drop across the two diodes in series and it will therefore be evident that the circuit according to the present invention tends to expand the proportional beta readings at the low end of the scale by providing a relatively high current supply even at lower voltages.

In the operation of the circuit according to FIGURE 1, following adjustment of meter M to full scale deflection with the probes disconnected, the emitter and collector probe elements 26 and 30 are first pressed against the emitter and collector terminals of a transistor on a printed circuit board and the reading of meter M is observed to determine collector to emitter shunt resistance. This will be shown by a down scale deflection of the meter pointer.

The base probe point 28 is then engaged with the base terminal of the transistor and, if the transistor is functioning normally, a down scale deflection of the meter pointer will result, indicating that the transistor is functioning properly and giving a reading to determine the proportional beta.

Lamp $L_1$ will also be illuminated showing base circuit continuity.

If, on the other hand, the pointer of the instrument does not move down scale and lamp $L_1$ lights, this will indicate an open collector junction in the transistor.

Still further, if the instrument pointer moves down scale to rest at approximately zero with or without base current then the collector of the transistor is shorted.

If lamp $L_1$ does not light up then the transistor has an open base to emitter junction.

From the foregoing it will be seen that the device according to the present invention will fully indicate the condition of transistors soldered into a printed circuit board, and connected in circuits so as to either have shunt resistance or to have no shunt resistance, and either with or without other leakage paths involving impedance elements such as condensers or coils.

No panel controls need be manipulated so that the operator has freedom for use of both hands to manipulate the probe elements and to hold the printed circuit board. The device is battery operated so there is no shock hazard to the operator of the equipment. Current limiting is effected in the collector and base circuits and this prevents overloading of the transistor. Similarly, the meter is completely protected from overloading at all times.

The device is fast to operate and the transistors on a printed circuit board can be analyzed at a rapid rate.

Diodes can readily be checked for forward resistance, using the collector and emitter probes 26 and 30, and may be checked for leakage by removing them from the printed circuit board.

Referring now to FIGURE 2 this system operates on the basis that a specific base current delivered from battery B to transistor 62 via adjustable resistor $R_1$ will cause a predetermined finite collector current to flow through the transistor.

A diode $D_1$ connected in parallel with the meter and the resistor $R_3$ in series with the meter limits short circuit current through the meter and provides scale expansion at the low beta end of the scale.

Resistor $R_1$ is so chosen to allow the desired amount of base current to flow in the base emitter junction of the transistor, and the resultant collector current from the battery to the collector of transistor 62 will be in direct proportion to the D.C. beta of the transistor and will flow through the network of resistors $R_2$ and $R_4$ and diode $D_1$ and will cause a deflection of the pointer of the meter. The voltage drop will be on the order of millivolts.

Resistor $R_3$ represents the calibrating adjustment for the beta scale on the meter M.

While resistor $R_2$ and diode $D_1$ protect the meter from any excessive overload such as could occur if they shorted when the transistor was placed under test, resistor $R_2$ thus acts as a current limiter, but does not affect the beta readings because the collector circuit is essentially a high resistance circuit.

Diode $D_1$ provides a low resistance shunt path bypassing the meter whenever the voltage drop across $R_4$ reaches high values as it would in the event a shorted transistor were placed under test.

The scale of meter $M_1$ will be determined and the calibration thereof will be controlled by the size of resistor $R_1$ and it is to be understood that different resistance values could be placed at this point in the circuit, or multiple resistors could be provided to be switched in and out, thereby providing for additional scales for the beta reading on the meter.

As to FIGURE 3, this shows the circuit arrangement for measuring $I_{cbo}$ or leakage current and consists of resistors $R_5$, $R_6$, $R_7$, and $R_8$, diode $D_2$ and the same aforementioned battery B and meter M. The transistor under test is indicated at 64.

With this measurement it is desired to cover a wide range of leakage currents because this particular quality of a transistor is highly variable.

To accomplish this wide range of measurements while still taking full advantage of the sensitivity of the meter M, the combination of resistors $R_6$ and $R_7$ and diode $D_2$ is used as a non-linear shunt circuit for effecting scale expansion.

For low values of current, for example, in the low microampere range, the voltage developed across $R_6$ is below the threshold of conduction of diode $D_2$.

Resistor $R_6$ is a relatively high resistance compared to the resistance of meter M and the meter at this time will operate very close to its normal current sensitivity. However, as the current increases the voltage drop across $R_6$ increases and diode $D_2$ will commence to conduct.

As the current further increases more and more current will flow in the diode shunt path which can be controlled by the setting of resistor $R_7$, and this will in turn influence the pointer deflection of meter M.

As an example, at full scale deflection of meter M, 75% of the total collector current would be passing through the combination shunt path of resistors $R_6$ and $R_7$ and diode $D_2$ while 25% of the current would pass through meter M. This would provide for four times the scale expansion of the base meter range.

For a 50 micro-ampere instrument, for example, the aforementioned division of current would mean that at a 2% deflection of the meter pointer the meter would be reading very close to 1 micro-ampere, while at full scale or 100% pointer deflection the meter would be reading four times its rated value or 200 micro-amperes.

The expansion of the meter scale by the described circuit arrangement will thus be evident.

Resistor $R_5$ in combination with diode $D_2$ provides current limiting in the system so that excessive current through the meter M will be avoided if the transistor under test is short circuited.

Resistor $R_8$ is a calibrating resistor. It is of the adjustable type so that the meter sensitivity can be adjusted.

From the foregoing it will be seen that the test device according to the present invention is adapted for both in-circuit and out-of-circuit testing of solid state components such as transistors and diodes and the like. The test device is simple to use and has many advantages such as being shock-proof, completely portable, and so easily manipulated that it can be operated by one hand while the other hand holds a circuit board carrying the components to be tested.

I claim:

1. A testing device for in circuit or out of circuit transistors comprising; a source of direct current voltage; a series circuit connected across the terminals of said source, said series circuit comprising a relatively low value resistor, a first parallel diode and resistor network connected to said resistor, a relatively high value current determining resistor connected to said parallel network, a stabilizing diode connected to said high value resistor and having a current indicator connected thereacross, a second parallel diode and resistor network connected to said stabilizing diode, and another relatively low value resistor connected to said second parallel network, all of said diodes being poled to conduct current in their forward direction with respect to said source; a first probe means connected between the first parallel network and the relatively high value resistor, and a second probe means connected between the second parallel network and the stabilizing diode, said first and second probe means being adapted for connection to the collector and emitter terminals of the transistor under test; a second circuit connected to said source and including the series arrangement of a base current selection resistor, a base current determining resistor, a switch, and a third probe means for connection to the base of the transistor under test; and a base current indicator circuit comprising a second source of voltage, a lamp and a transistor having its collector-emitter circuit connected across said second source and said lamps in series, and its base-emitter circuit connected across said base current determining resistor.

2. The apparatus of claim 1 wherein the probe means comprises probe tips for connection to the test points, a glovelike member adapted for mounting on the hand and having at least three finger receiving portions, said probe tips being mounted on the ends of said finger receiving portions, and wires leading along said finger receiving portions connecting said probe tips to the test circuitry.

References Cited

UNITED STATES PATENTS

| | | | |
|---|---|---|---|
| 2,311,276 | 2/1943 | Wilcox | 2—160 X |
| 2,555,203 | 5/1951 | Ramsey | 2—160 X |
| 2,571,458 | 10/1951 | Lawrence | 324—119 X |
| 2,776,420 | 1/1957 | Woll. | |
| 2,922,954 | 1/1960 | Bigelow | 324—158 |
| 3,237,104 | 2/1966 | Merkel | 324—158 |

OTHER REFERENCES

Radio-Electronics (Frye), vol. 29, No. 3, March 1958, pp. 47–50.

RUDOLPH V. ROLINEC, *Primary Examiner.*

E. L. STOLARUN, *Assistant Examiner.*